W. H. OGDEN.
INTERNAL COMBUSTION ENGINE.
APPLICATION FILED JUNE 20, 1911.

1,020,953.

Patented Mar. 19, 1912

5 SHEETS—SHEET 1.

WITNESSES
C. H. Walker
Lillie M. Perry

INVENTOR
William H. Ogden
by Wm. H. Luedke
Attorney

W. H. OGDEN.
INTERNAL COMBUSTION ENGINE.
APPLICATION FILED JUNE 20, 1911.

1,020,953.

Patented Mar. 19, 1912.

5 SHEETS—SHEET 2.

WITNESSES

INVENTOR
William H. Ogden
by Attorney

W. H. OGDEN.
INTERNAL COMBUSTION ENGINE.
APPLICATION FILED JUNE 20, 1911.

1,020,953.

Patented Mar. 19, 1912.

5 SHEETS—SHEET 3.

WITNESSES

INVENTOR
William H. Ogden
by his Attorney

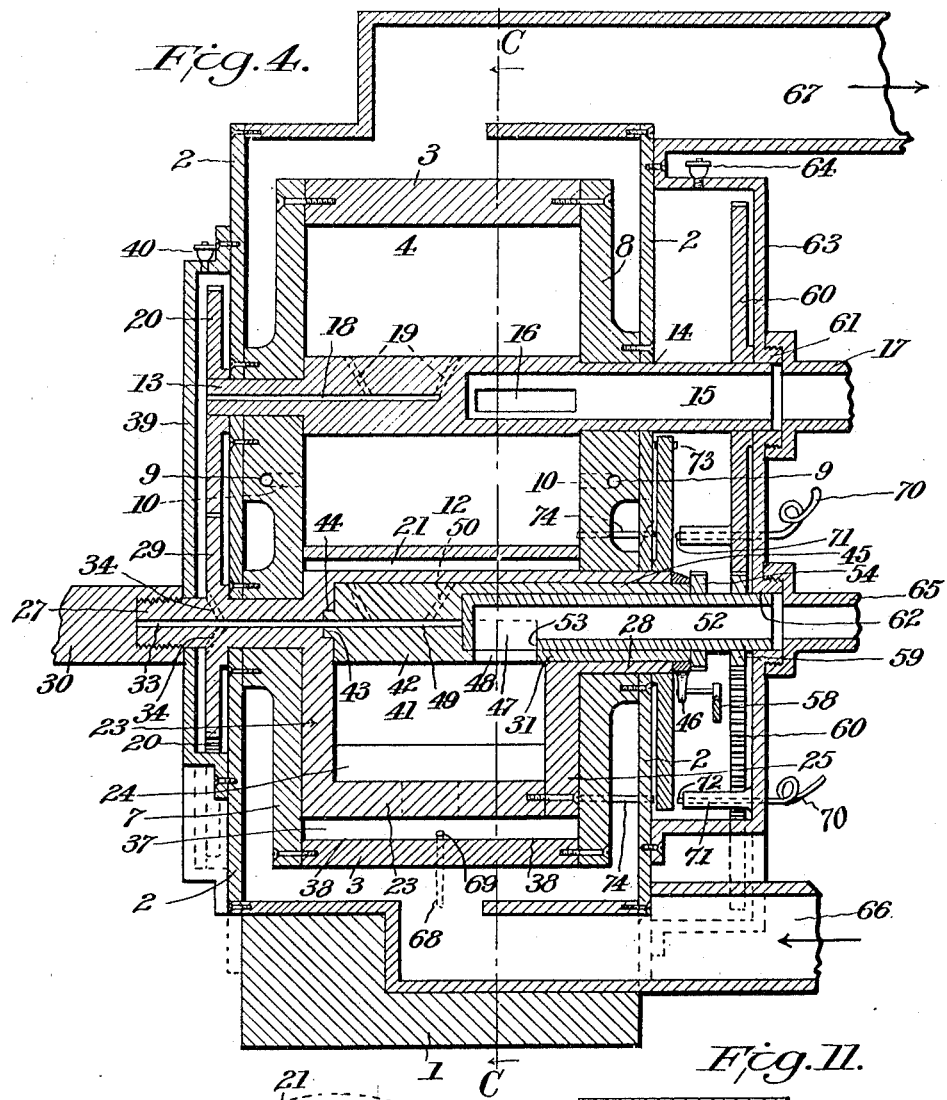

W. H. OGDEN.
INTERNAL COMBUSTION ENGINE.
APPLICATION FILED JUNE 20, 1911.

1,020,953.

Patented Mar. 19, 1912.

5 SHEETS—SHEET 5.

WITNESSES

INVENTOR
William H. Ogden
by M. H. Finckel
Attorney

UNITED STATES PATENT OFFICE.

WILLIAM H. OGDEN, OF BINGHAMTON, NEW YORK.

INTERNAL-COMBUSTION ENGINE.

1,020,953.  Specification of Letters Patent.  Patented Mar. 19, 1912.

Application filed June 20, 1911. Serial No. 634,385.

*To all whom it may concern:*

Be it known that I, WILLIAM H. OGDEN a citizen of the United States, residing at Binghamton, in the county of Broome and State of New York, have invented a certain new and useful Improvement in Internal-Combustion Engines, of which the following is a full, clear, and exact description.

The object of this invention is to provide what may be designated a three-cylinder rotary internal combustion engine having a cumulative or continuous pressure effect in operation.

A single casing is employed, divided into three chambers or cylinders, in a trefoil arrangement, each of which has a piston in the form of a hinged leaf, and all coöperating with a combined rotary abutment and compression chest which also serves as a valve to control the supply of compressed gases successively to the cylinders, so that one cylinder will be operating under an explosion, the next will be operating under the expansion of its previous explosion, and the next will be exhausting its products of combustion while still under a lower pressure than that last preceding in the cycle.

In my application for patent filed May 16, 1911, Serial No. 627,579, I have shown and described an engine of the same general principle as that herein shown and described, but in the engine of such prior application steam is employed as the motive power for operating the engine, whereas in the present invention the engine is adapted to be operated by the combustion of gaseous fuel.

The invention consists in a rotary internal combustion engine having the characteristics just described; and it further consists in the gearing and gas supplying, controlling, compressing and igniting means by which the cycle of successive operations are effected.

Figure 1:
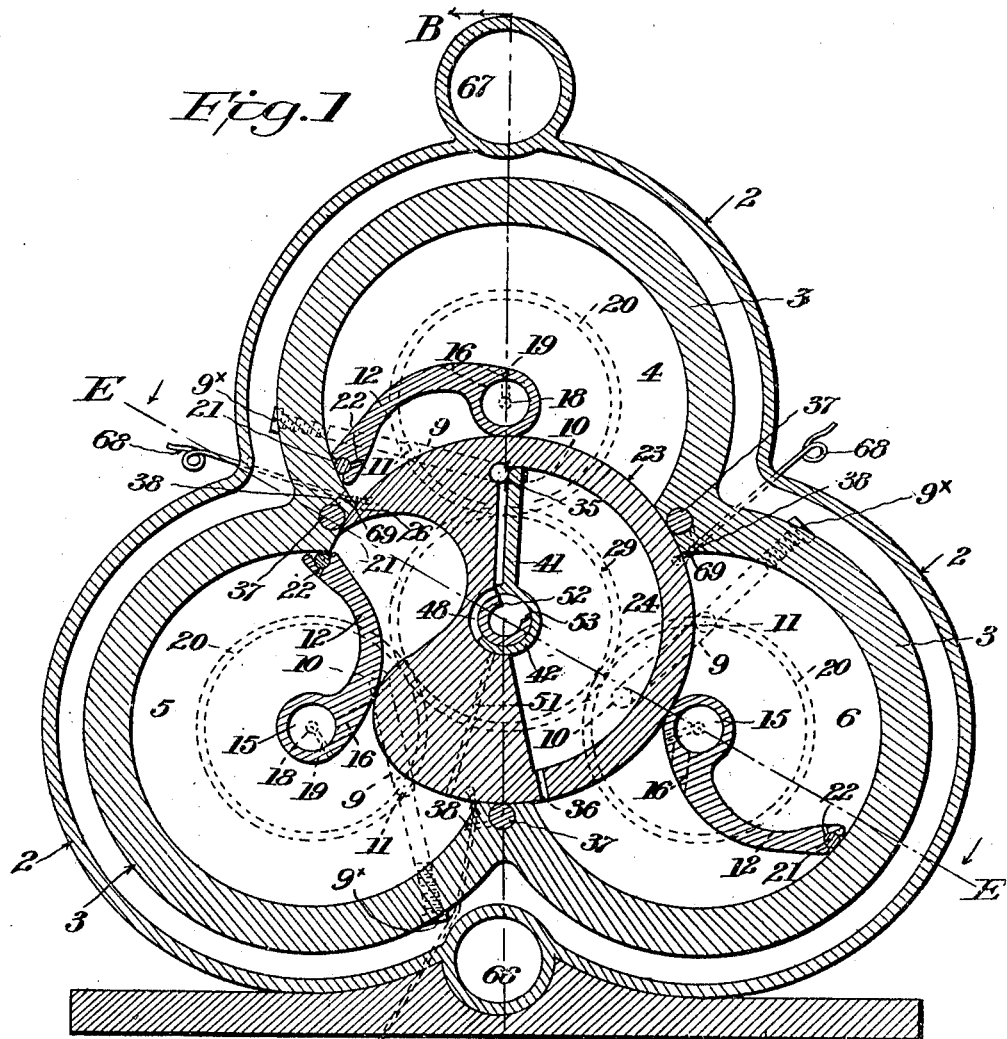
Figure 7:
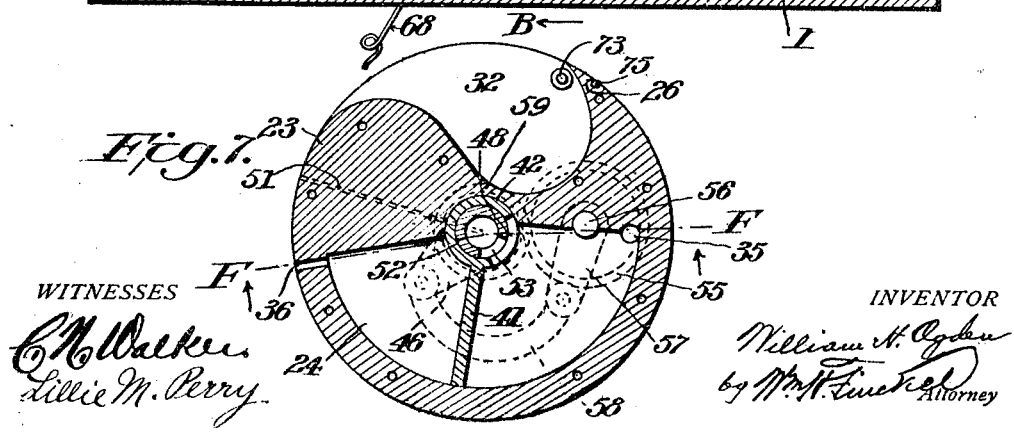
Figure 2:
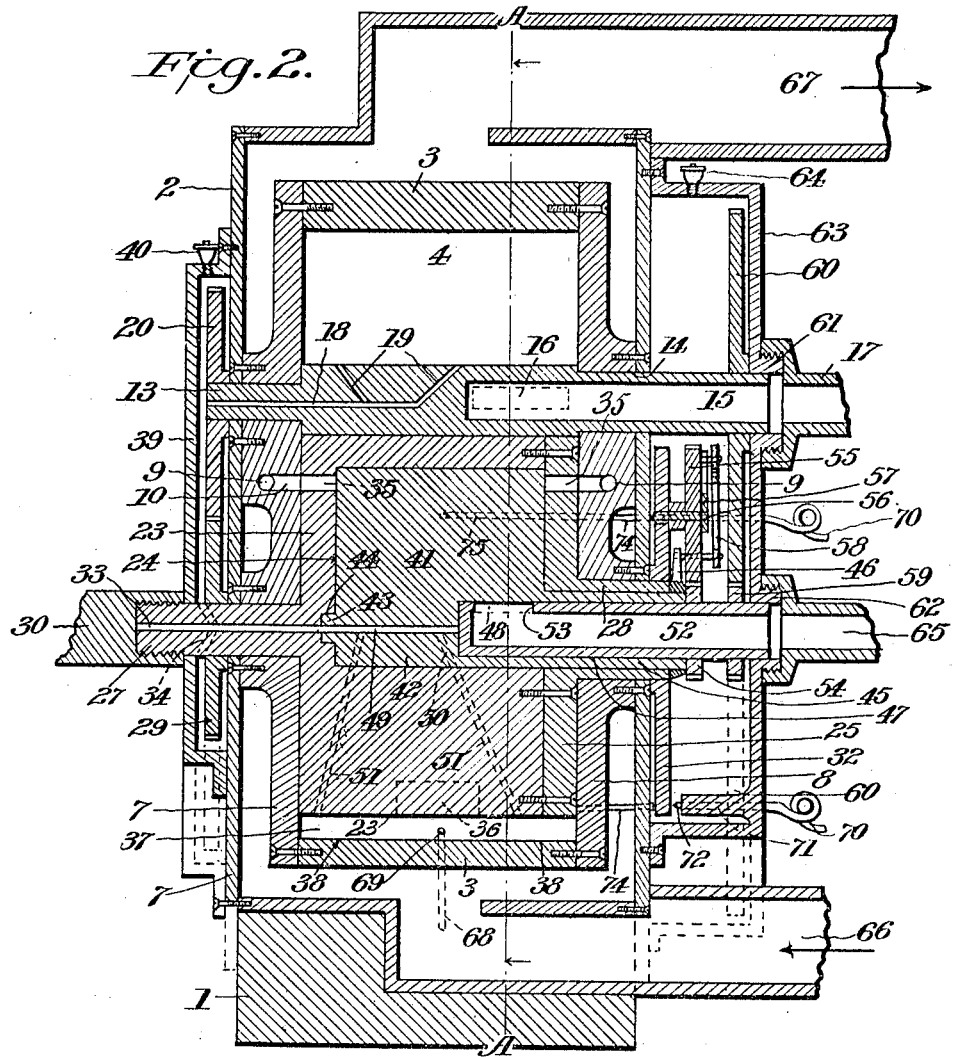
Figure 8:
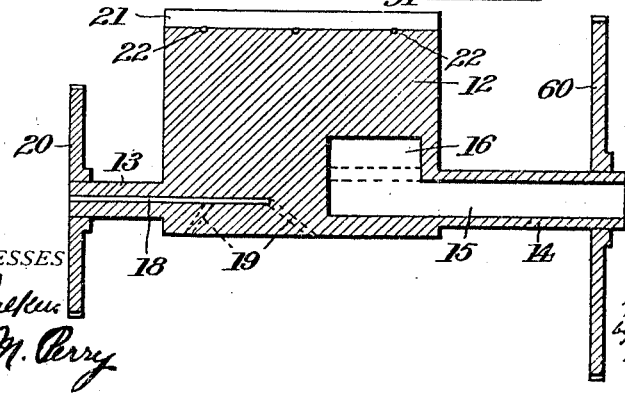
Figure 3:
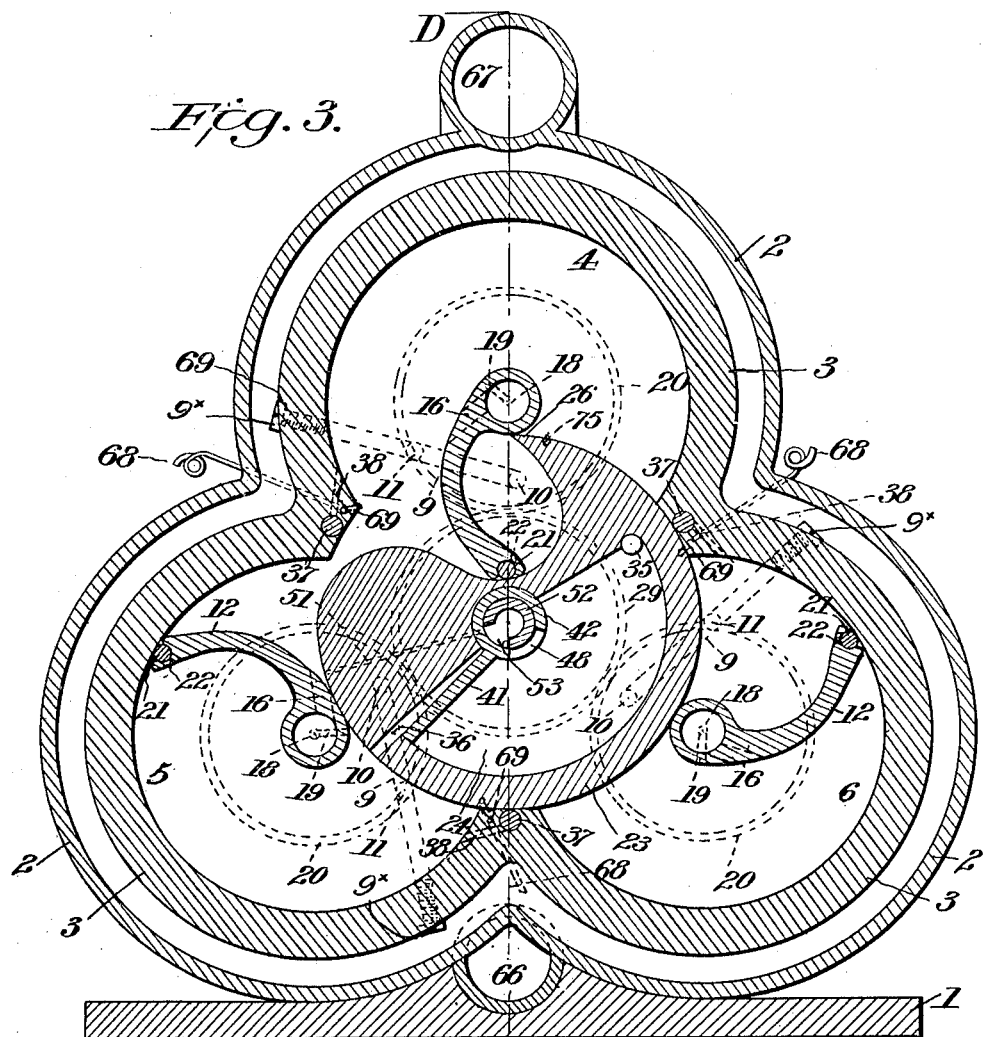
Figure 9:
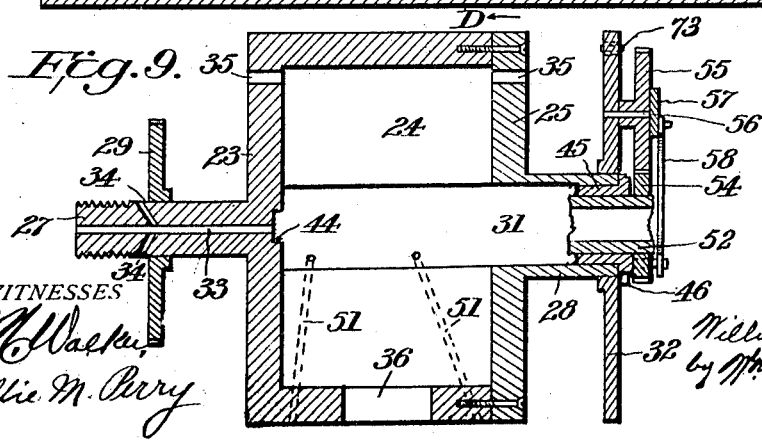
Figure 5:
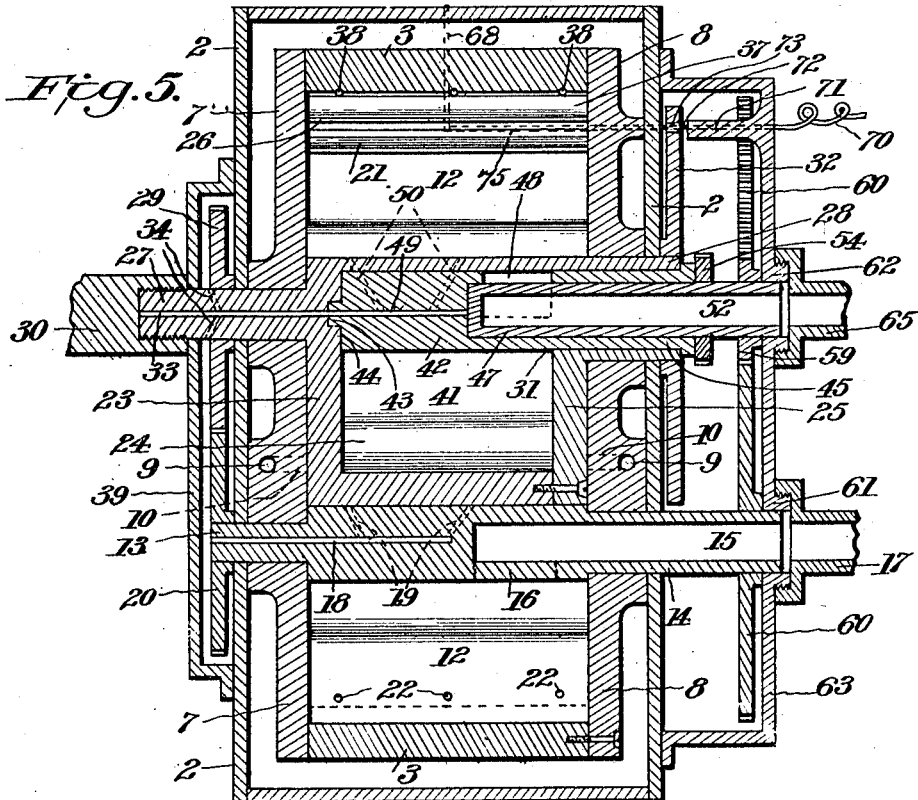
Figure 6:
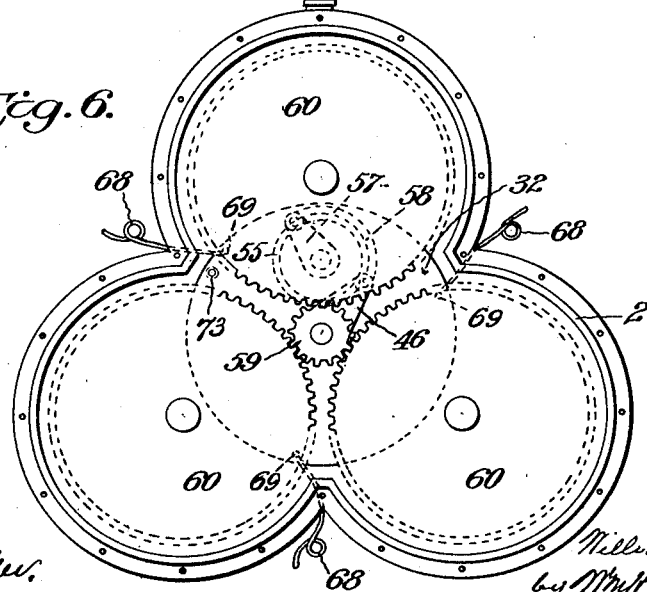

In the accompanying drawings illustrating the invention, in the several figures of which like parts are similarly designated, Figure 1 is a vertical section taken in the plane of line A A, Fig. 2, and looking in the direction of the arrows. Fig. 2 is a vertical transverse section taken substantially in the plane of line B B, Fig. 1, and looking in the direction of the arrows. Fig. 3 is a vertical section taken substantially in the plane of line C C, Fig. 4, and looking in the direction of the arrows, and Fig. 4 is a vertical transverse section taken substantially in the plane of line D D, Fig. 3, and looking in the direction of the arrows, the moving parts of the engine being shown in a different position from that shown in Figs. 1 and 2. Fig. 5 is a section taken substantially in the plane of line E E, Fig. 1, and looking in the direction of the arrows. Fig. 6 is an elevation, on a reduced scale, with the gear casing removed, and showing the mechanism for operating the compressing piston. Fig. 7 is a transverse section of the abutment and compression chest, and the compressing piston, showing the attached timer disk and also showing in dotted lines the compressing piston operating mechanism. Fig. 8 is a longitudinal section of one of the pistons and its attached gears. Fig. 9 is a longitudinal section, taken substantially in the plane of line F F, Fig. 7, of the abutment and compression chest, and looking in the direction of the arrows, and showing the compressing piston operating mechanism. Fig. 10 is a transverse section of one of the pistons showing its attached gears in dotted lines. Fig. 11 is a longitudinal section of the compressing piston.

Upon the base 1 is erected an outer casing 2, and suitably supported within and spaced apart from said outer casing to form a cooling chamber, is the cylinder casing 3, having the three cylinders 4, 5 and 6. Heads 7 and 8 are bolted or otherwise secured to opposite sides of the cylinder casing in any suitable way, to form a gas-tight interior. The heads 7 and 8 are provided with similar channels 9 for each cylinder, and these channels are closed by removable plugs 9ˣ, for cleaning out purposes, and each of these channels has two lateral ports 10 and 11 opening into the respective cylinders. Each cylinder is provided with a leaf-like concavo-convex piston 12 having trunnions 13 and 14 at opposite ends, and these trunnions have bearings in the heads 7 and 8 of the casing 2, whereby each piston is, as it were, hinged in the heads concentrically and is capable of rotary motion within its respective cylinder. That portion of each piston having the trunnions in line forms a sort of knuckle, and is herein so designated. Each piston has its end or trunnion 14 made hollow longitudinally, as at 15, with a lateral port 16 opening into the cylinder, the hollow portions of the several pistons extending outside of the engine and opening into pipes 17 which may be suitably connected, and, if desired, attached to a fan or other suction apparatus for conveying away the exhaust products of combustion. Each piston may also have ducts 18 extending longitudinally therein and opening at 19 for lubricating purposes. The trunnion 13 of each piston is supplied with a gear wheel 20. The free end of each piston is supplied with a roller bearing or other antifriction device 21; and in order to make a gas-tight joint between the bearing and the wall of the cylinder, the piston is provided with ducts 22 beneath the antifriction device, so as to permit the pressure of the exploded charge to act against the antifriction device, so as to force it against the cylinder wall.

23 is a combined abutment and compression chest of volute outline in cross-section, having the segmental compression chamber 24 and the head 25 to inclose it in a gas-tight manner. This abutment and compression chest has a hook-like leading end 26. The abutment and compression chest 23 is mounted centrally in the casing 2, upon trunnions 27 and 28. Upon the trunnion 27 is mounted a gear wheel 29 which meshes with the gear wheels 20 of the several pistons; and this trunnion 27 also has attached to it the power-transmitting shaft 30. The trunnion 28 is provided with a longitudinal channel or bore 31 extending into the compression chamber 24. The trunnion 28 extends through the cylinder casing 2 and has attached to it a timer disk 32. The trunnion 27 is supplied with a duct 33 from which opens lateral ducts 34 for the distribution of lubricant. As shown in Figs. 1, 2, 3 and 9, each side or head of the compression chest is supplied with a lateral port 35 arranged at or near the forward end of the compression chamber and adapted to communicate with the lateral ports 10 of the channels 9 in the casing 3. The compression chest is also provided with a centrally arranged peripheral port 36 at or near the rear end of the compression chamber, and establishing communication between the compression chamber and cylinders. The abutment and compression chest makes a gas-tight connection with the driving walls of the three cylinders, by means of the antifriction bearings 37, which serve also as packing and which may be held up to their work by pressure admitted thereto from the cylinders through ducts 38 arranged back of the antifriction devices 37.

The gears 20 and 29 are preferably inclosed in a casing 39 secured in a fluid-tight manner to the outer casing 2, so as to form an oil chamber, which may be supplied from an oil cup 40, and from which chamber the oil is distributed to the parts needing lubrication.

Arranged within the compression chamber 24 is the compressing piston, comprising the leaf or blade 41 and the knuckle 42, the said knuckle being supplied with the trunnion 43 fitted in a bearing 44 in the head of the compression chest. The knuckle 42 is also supplied with a trunnion 45, fitted in the bored trunnion 28 of the abutment, and extending slightly beyond the timer disk 32, and provided at its outer end with an arm 46. The trunnion 45 and the knuckle 42 are bored longitudinally, as at 47, and said bore is provided with a lateral port 48, affording communication with the compression chamber. The knuckle 42 at its opposite end is supplied with a longitudinal duct 49 and lateral ducts 50, communicating with the duct 33 in the trunnion 27 and also with the interior of the compression chamber and with lateral ducts 51 in the abutment to direct the lubricant to the parts requiring lubrication.

Mounted in the bored trunnion 45 and knuckle 42 of the compressing piston is the rotary tubular valve 52 having a lateral port 53 coöperating with the lateral port 48 in the knuckle 42 to control the supply of gas to the compression chamber. The valve 52 extends beyond the outer casing 2 and has fastened to it a small gear wheel 54 adjacent to the end of the compressing piston trunnion 45, and meshing with a slightly larger gear wheel 55 mounted on a stud 56 carried by the timer disk 32. Also mounted on the stud 56 is a crank-arm 57, and an arcuate link 58 connects the arm 57 with the arm 46 on the end of the compressing piston trunnion 45. Also fixed upon the rotary valve 52 beyond the gear wheel 54 is a similar gear wheel 59 which meshes with larger gear wheels 60 fixed to the projecting ends of the piston trunnions 14, the ends of the trunnions 14 and the end of the rotary valve 52 being fitted in gas-tight bearings 61 and 62, respectively, formed in a fluid-tight casing 63 inclosing the several gears and compressing piston operating mechanism and supplied with lubricant through an oil-cup 64.

As above stated, the bored trunnions of the several pistons open into exhaust pipes 17. Similarly the rotary valve 52 at its bearing in the casing 63 is connected with a pipe 65 leading from a carbureter or other suitable gas supply.

66 and 67 are inlet and outlet pipes, respectively, communicating with the interior of the outer casing 2 of the engine, to be connected with a pump or other suitable water circulating system for cooling the engine.

68 are insulated wires passing through the outer casing 2 and the cylinder casing 3 at the three inward projections or points where the cylinder casing is engaged by the abutment, and having their terminals projecting into the combustion sides of the cylinders and forming sparking contacts 69 arranged about centrally of the engine.

70 are insulated wires passing through the gear casing 63 at three points adjacent to the combustion sides of the cylinders and through inwardly projecting lugs 71 formed upon the inside of the gear casing and having their terminals 72 projecting slightly beyond said lugs and forming contacts in close proximity to the timer disk 32.

73 is a short length of insulated wire fixed in the timer disks 32 and having contact points projecting from opposite sides of the timer disk.

74 are insulated wires passing through the inner and outer casings of the engine at three points adjacent to the combustion sides of the cylinders and having one of their terminals projecting slightly beyond the outer casing 2 and the other of their terminals projecting into and exposed upon the inner wall of the cylinder head.

75 is an insulated wire embedded in the leading end 26 of the abutment and having its terminals exposed at its side wall in the path of the leading-in wires 70 and 74 and at a point about centrally of the leading end 26 in the path of the leading-in wires 68 and their contact points 69. The wire 73 and its projecting contacts carried by the timer disk 32 are arranged in the path of the contacts of the leading-in wires 70 and 74 and serve to complete the circuit when they reach this point, the sparking occurring by the making and breaking of the circuit at the contact 69 and the contact at the leading end 26 of the abutment. The leading-in wires may be connected with any suitable generator or battery for supplying the sparking current. Instead of the leading-in wires 68 with their contacts 69, the wiring may be suitably arranged in the surface of the abutment and a spark-plug introduced in the circuit at the leading end of the abutment and the circuit grounded through the abutment.

The operation of the engine is as follows:—Any suitable means, such as a lever or crank, may be applied to the power shaft to start the engine, and by rotating said shaft the abutment and compression chest is rotated and carrying with it the timer disk 32, the planetary gear-wheel 55 is caused to rotate about the gear wheel 54 and about its own axis, and through the link and arm connection 46, 58 and 57, between the said planetary gear and the compressing piston, the compressing piston 41 is caused to open as shown in Fig. 3, and draws in gas through the ports 48 and 53, the several pistons being rotated at the same time through their gearing 20, and the rotary valve 52 for controlling the supply of gas to the compression chamber being operated through gears 60 connected to the pistons and gear 59 secured to said valve. Upon further revolution, the compressing piston is moved forward to compressing position by its peculiar planetary gear and link connection, and compresses the charge in the compression chamber, until the parts reach the position shown in Fig. 1, wherein the ports 35 have just passed the ports 10 of the passages 9 in the cylinder 4, in which the piston has reached the position to receive an explosion and the point or leading end of the abutment has engaged the casing to form a practically gas-tight combustion chamber between itself and the piston. When in this position the compressed charge has entered the combustion chamber through the passages 9 and the ports 11, and the timer disk 32, carried by the abutment, completes the circuit and the contact 75 carried by the leading end of the abutment brushes by the contact 69 and produces a spark and thus ignites the charge in cylinder 4 and starts the engine. This operation is repeated and each cylinder is charged and exploded in succession.

The combustion chamber as above indicated and as shown in Fig. 1 in cylinder 4, is formed by and between the leading end 26 of the abutment engaging the point of convergence of the walls of the cylinders 4 and 5 and the free end of the piston in cylinder 4 engaging the wall of said cylinder. The force of the explosion exerting its pressure against that piston moves it to the right, while the abutment and compression chest assuming that motion is started, as above, moves in the opposite direction. As the motion of the piston in cylinder 4 and the abutment and compression chest progresses, the other pistons will be correspondingly moved in the same direction by virtue of the gearing, and when the abutment and compression chest is moved sufficiently far to cover the port 10 leading to cylinder 4, and while ports 35 are moving from ports 10 of cylinder 4 to ports 10 of cylinder 5, the compressing piston will again be operated to draw in and compress a fresh charge of gas to be let into cylinder 5 as soon as the ports 35 reach ports 10 of cylinder 5 and an explosion then takes place in cylinder 5, and so on successively, the explosions take place in the several cylinders. That is to say, after the explosion in cylinder 4 and the abutment and compression chest has moved so that its ports 35 have passed the ports 10 in the cylinder 5, the piston in cylinder 5 will occupy relatively the same position to the abutment and compression chest that the piston in cylinder 4 occupied at the start, a fresh charge of compressed gas having entered cylinder 5 to be ignited therein by the sparker while the products of combustion in cylinder 4 will be exerting its force. In the further progress of the motion, the piston in cylinder 6 will be similarly supplied with a compressed charge of gas to be ignited as before, and the piston in cylinder 5 will be acting under its exploded charge, while the piston in cylinder 4 will be exhausting through its port 16 and resuming its position to receive a fresh charge of compressed gas. In this way the pressure of the explosions is present and active in the cylinders continuously after the initial cycle is completed, and the parts are kept in uninterrupted motion thereafter. The combined abutment and compression chest thus serves as a valve for controlling the supply of compressed gas successively to each cylinder.

The volute outline of the combined abutment and compression chest affords a recess beneath its leading end to afford clearance for the pistons as they successively come opposite the same in their revolutions, the free ends of these pistons having their antifriction or packing devices rolling freely by but not necessarily in contact with the curved wall of the abutment and compression chest at such times, while at all other times the knuckles of the pistons are in rolling contact with the concentric circular wall of the abutment and compression chest. When the pistons successively enter that stage of their motion shown in cylinder 5, Fig. 1, the exhaust becomes fully operative. It will be understood that the exhaust ports are always open ahead of the direction of motion of the pistons and consequently the cylinders are freed from back pressure, and not only so, but the pull of the fan or other suction device to which the exhaust pipes may be connected in taking the exhaust aids the force of the expanding charge in working the pistons.

During the operation of the engine and in the travel of the abutment and compression chest the ports 35 of the compression chamber coincide with the respective ports 10 of the cylinders in every one-third revolution of the abutment and compression chest, and during the travel of the ports 35 between the respective ports 10, the ports 35 are closed by engagement with the heads of the cylinders, and the compressing piston 41 is caused to oscillate back and forth in the compression chamber by the action of the planetary gear 55 and its crank and link connection with the trunnion 45 of the compressing piston; and in the backward movement of the compressing piston, the port 48 in the knuckle of the compressing piston and the port 53 in the rotary valve 52 are opened to admit a supply of gas through passage 65 into the compression chamber, and also during the backward movement of the compressing piston the port 36 in the compression chamber is open to the exhaust side of its respective cylinder, as shown in Fig. 1, thus permitting the free backward motion of the compressing piston. On the forward or compressing stroke of the compressing piston, the admission ports 48 and 53 are closed and the port 36 of the compression chamber has entered the combustion side of its respective cylinder, as shown in Fig. 3, and the pressure from the said cylinder enters the rear side of the compressing piston and tends to aid in forcing the compressing piston in its compression stroke, whereby the gas is highly compressed and discharged into the combustion side of the cylinder when the parts reach the position indicated in Fig. 1, and the charge ignited by the sparker as hereinbefore described. These operations are repeated on every one-third revolution of the abutment and compression chest, the gearing and operating devices being so timed and arranged as to cause the proper relative movements of the parts to effect such operations, and the contact carried by the timer disk being so positioned as to cause the sparking to effect the ignition of the charge at the proper time.

As the leading end 26 of the abutment and compression chest advances from the position shown in Fig. 3, the knuckle of the piston in cylinder 4 is in rolling contact with the concentric wall of the abutment and compression chest and the leading end 26 advances along the concave side of and in contact with the said piston, the said piston and abutment forms a gradually increasing chamber of more or less perfect vacuum between the heads 7 and 8 of the cylinder casing, and as the leading end 26 of the abutment and compression chest approaches the casing 3, the ports 35 reach the ports 10, the compressing piston having advanced about half-way on its compression stroke, the compressed gas in the compression chamber is then forced quickly into the vacuum combustion chamber, above described, by the final part of the compression stroke of the compressing piston, and as the compressing piston finishes its compressing stroke, the leading end 26 of the abutment and compression chest has reached the roller bearing 37 and ports 35 have passed by ports 10 and the sparker ignited the charge. Should any back firing occur by reason of close proximity of ports 35 and 10, it would simply aid in the backward movement of the compressing piston and would happen before inlet ports 48 and 53 are opened for a fresh supply of gas.

It will be observed from the above that the ignition or combustion chamber is each time before receiving a fresh charge of compressed gas, perfectly cleansed or scavenged of the waste products of combustion of its previous explosion, and the pistons in their rotations force the waste products of combustion out through their respective exhausts. Furthermore, it will be observed that all the internal moving parts of the engine move against each other and automatically cleanse themselves, so there can be no carbonizing of the parts, thus preserving a smooth rolling contact between said parts and prolonging an easy and smooth operation of the engine.

The gear casings 39 and 63 are kept full of oil through their filling cups 40 and 64, and the oil is fed to the several parts requiring lubrication through the ducts hereinbefore described, and no oil can escape from the engine, excepting through the exhaust ports of the pistons, and these being practically inaccessible, all the oil must remain inside until consumed, thus using the minimum quantity, without waste, and giving complete and perfect lubrication to all parts requiring lubrication. It will be observed that the oil ducts 19 in the knuckles of the pistons open only on the exhaust side of the pistons.

It will be observed that the abutment is in rolling contact with the knuckles of the pistons, and this contact is sufficiently close to form a substantially gas-tight joint, this characteristic of the joint being enhanced by the constant lubrication of the parts in the manner already described.

I have shown my invention as utilized in a cluster of three cylinders, arranged so that they become active successively, but wish it understood that I do not limit the invention to the number of cylinders employed. The three-cylinder arrangement would seem to afford the most economical and effective use of the motive power.

I have herein shown the power pistons and the compressing piston and their respective cylinders and chamber rectangular in shape, but I wish to be understood as not limiting the invention to this particular shape, as it is obvious that these parts may be constructed of any other desired shape.

What I claim is:—

1. An internal combustion engine, having a cluster of cylinders, a combined abutment and compression chest, a compressing piston in said compression chest, a revolving piston in each cylinder, independent gas ports for the several cylinders, means to rotate the combined abutment and compression chest and the pistons in unison, and means to oscillate the compressing piston during the rotation of the abutment and compression chest, said abutment and compression chest serving to control the gas ports leading into the several cylinders.

2. An internal combustion engine, comprising a casing having three cylinders in a trefoil arrangement, a hinged leaf rotary piston in each cylinder, a rotary abutment and compression chest, gears connecting the pistons and abutment and compression chest to turn in unison, the pistons turning in one direction and the abutment and compression chest in the reverse direction, a compressing piston in said compression chest, means for oscillating said compressing piston during the rotation of the abutment and compression chest, and gas ports leading separately into the several cylinders and through which the compressed gas from the compression chest to the cylinders is controlled by the abutment and compression chest.

3. An internal combustion engine, comprising a casing having three cylinders in a trefoil arrangement, a hinged leaf rotary piston in each cylinder, a rotary abutment and compression chest mounted centrally between the three cylinders and geared to turn in the opposite direction to the pistons, a separate gas channel opening into each cylinder and having its intake in the path of movement of the rotary abutment and compression chest, a compressing piston in the compression chest, and means for oscillating said compressing piston during the rotation of the abutment and compression chest, the said abutment and compression chest successively admitting compressed gas to the several cylinders through said channels, so that while the gas is being compressed and exploded in one cylinder, the ignited gas in the preceding cylinder in the direction of movement of the abutment and compression chest will be expanding, and the remaining cylinder will be exhausting.

4. An internal combustion engine, having a cluster of cylinders, a revolving piston in each cylinder, a combined abutment and compression chest of volute shape in cross-section arranged between the several cylinders and in gas-tight contact at all times with the several pistons, a casing common to said cylinders and said combined abutment and compression chest, means to rotate the pistons and abutment and compression chest in unison but in opposite directions, a compressing piston in said compression chest, means to oscillate said compressing piston during the rotation of the abutment and compression chest, and independent gas inlets for the several cylinders, the abutment and compression chest serving to control said inlets successively.

5. An internal combustion engine, having a cluster of cylinders, a revolving piston in each cylinder, a combined rotary abutment and compression chest mounted between the several pistons and in gas-tight contact at all times with said pistons either through their knuckles or their free ends during the cycle of movement of each, a compressing piston in said compression chest, means for oscillating said compressing piston during the rotation of the abutment and compression chest, independent gas inlets for each cylinder, independent exhausts for each cylinder, a casing common to all of these parts, the combined abutment and compression chest rotating within the casing and serving as a valve to control the admission of compressed gas successively to the cylinders, and a valve for controlling the supply of gas to the compression chest.

6. An internal combustion engine, having a cluster of cylinders, a revolving piston in each cylinder, a combined rotary abutment and compression chest mounted between the several pistons and in gas-tight contact at all times with said pistons either through their knuckles or their free ends during the cycle of movement of each, a compressing piston in said compression chest, means for oscillating said compressing piston during the rotation of the abutment and compression chest, independent gas inlets for each cylinder, independent exhausts for each cylinder, a casing common to all of these parts, the combined abutment and compression chest rotating within the casing and serving as a valve to control the admission of compressed gas successively to the cylinders, a valve for controlling the supply of gas to the compression chamber, and a passage in said compression chest for admitting and exhausting the pressure into and from the compression chamber during the strokes of the compression piston, as said passage passes through the combustion and exhaust sides respectively of the several cylinders.

7. An internal combustion engine, having a cluster of cylinders in a single casing with heads common to all, a revolving leaf-like piston in each cylinder, said pistons mounted to turn in said heads and having axially arranged exhausts, a volute rotary combined abutment and compression chest mounted to turn in said heads between the pistons and in gas-tight connection with the pistons, casing and heads, the pistons and combined abutment and compression chest being connected to turn in unison but in opposite directions, a compressing piston in said compression chest, means for oscillating said compressing piston during the rotation of the abutment and compression chest, an independent gas inlet for each cylinder, means for controlling the supply of gas to said compression chest, said combined abutment and compression chest in its rotation serving to successively admit compressed gas from the compression chest to and cut it off from the cylinders.

8. An internal combustion engine, having a cluster of cylinders, a combined abutment and compression chest, a compressing piston in the compression chest, a revolving piston in each cylinder, independent gas ports for the several cylinders, means to rotate the combined abutment and compression chest and the pistons in unison, means to oscillate the compressing piston during the rotation of the abutment and compression chest, said abutment and compression chest serving to control the gas ports leading into the several cylinders to successively admit a charge of compressed gas into said cylinders, and means to successively ignite the said charges of compressed gas.

9. An internal combustion engine, having a cluster of cylinders, a combined abutment and compression chest, a timer disk carried by said abutment and compression chest, a compressing piston in the compression chest, a revolving piston in each cylinder, independent gas ports for the several cylinders, means to rotate the combined abutment and compression chest and the pistons in unison, means to oscillate the compressing piston during the rotation of the abutment and compression chest, said abutment and compression chest serving to control the gas ports leading into the several cylinders to successively admit a charge of compressed gas into said cylinders, a sparking circuit, including leading-in wires for each cylinder, passing through the engine casing, conductors carried by the abutment and timer disk and moving in the path of the leading-in wires to successively complete the circuit for each cylinder, sparking contacts arranged in the combustion sides of the cylinders, and a sparking contact carried by the leading end of the abutment and in the path of the contacts of the several cylinders to successively ignite the charges in the several cylinders.

10. An internal combustion engine, having a cluster of cylinders, a combined abutment and compression chest, a hinged compressing piston in said compression chest having a hollow knuckle communicating with the compression chest, a revolving piston in each cylinder, independent gas ports for the several cylinders, means to rotate the combined abutment and compression chest in unison but in opposite directions, a planetary gear and link connection for oscillating the compressing piston during the rotation of the abutment and compression chest, a rotary valve arranged in the hollow knuckle of the compressing piston for controlling the supply of gas to the compression chest, gearing operated by the pistons for rotating said valve to cause the valve to be opened and closed during the oscillation of the compressing piston to admit and cut off the supply of gas to the compression chest, the said abutment and compression chest serving to control the gas ports leading into the several cylinders to admit a charge of compressed gas from the compression chest to the several cylinders successively, and independent exhausts for the several cylinders.

11. An internal combustion engine, having a cluster of cylinders, a combined abutment and compression chest arranged between said cylinders, a compressing piston in said compression chest, a revolving piston in each cylinder, means for successively admitting a charge of compressed gas into said cylinders from the compression chest, a sparking circuit for each cylinder, a rotary timer disk having a connector for successively completing said sparking circuits, gearing for operating the gas controlling means and compressing piston, and a liquid-tight casing inclosing said gearing and said timer disk and its attached connector, whereby the lubricant contained therein will surround said gearing and timer disk and the exposed contacts of the sparking circuits.

In testimony whereof I have hereunto set my hand this 19 day of June A. D. 1911.

WILLIAM H. OGDEN.

Witnesses:
 ONIDA JANISON,
 ALLYN K. MAREAN.

Copies of this patent may be obtained for five cents each, by addressing the "Commissioner of Patents, Washington, D. C."